US006978897B2

(12) United States Patent
Kutaragi et al.

(10) Patent No.: US 6,978,897 B2
(45) Date of Patent: Dec. 27, 2005

(54) RECORDING MEDIUM HOLDER AND INFORMATION PROVIDING BODY

(75) Inventors: Ken Kutaragi, Tokyo (JP); Teiyu Goto, Tokyo (JP); Mariko Hino, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 10/615,221

(22) Filed: Jul. 8, 2003

(65) Prior Publication Data

US 2004/0097278 A1 May 20, 2004

Related U.S. Application Data

(63) Continuation of application No. 09/648,017, filed on Aug. 25, 2000, now Pat. No. 6,604,635.

(30) Foreign Application Priority Data

Aug. 25, 1999 (JP) ................................ 11-238986

(51) Int. Cl.[7] ............................................... B65D 85/57
(52) U.S. Cl. .................... 206/579; 206/232; 206/307.1
(58) Field of Search ................................ 206/303, 232, 206/307, 307.1, 308.1, 308.3, 310, 579; 312/223.3

(56) References Cited

U.S. PATENT DOCUMENTS

| | | | |
|---|---|---|---|
| 3,466,774 A | 9/1969 | Borresen | 206/232 |
| 4,009,781 A | 3/1977 | Agnew et al. | 206/307.1 |
| 4,108,307 A | 8/1978 | Feingold et al. | 206/307.1 |
| 4,566,590 A | 1/1986 | Manning et al. | 206/307.1 |
| 4,869,364 A | 9/1989 | Bray | 206/307.1 |
| 4,993,552 A | 2/1991 | Bugbey et al. | 206/307.1 |
| 5,207,717 A | 5/1993 | Manning | 206/307.1 |
| 5,284,243 A | 2/1994 | Gelardi et al. | |
| 5,324,036 A | 6/1994 | Morrow | 312/223.3 |
| 5,515,967 A | 5/1996 | Fitzsjmmons et al. | 206/307.1 |
| 5,597,068 A | 1/1997 | Weisburn et al. | 206/307.1 |
| 5,599,231 A | 2/1997 | Hibino et al. | 463/29 |
| 5,653,335 A | 8/1997 | Bauer et al. | 206/307.1 |
| 5,788,068 A | 8/1998 | Fraser et al. | 206/307.1 |
| 5,899,327 A | 5/1999 | Sykes | 206/307.1 |
| 5,915,548 A | 6/1999 | Sasaki | 206/307.1 |
| 6,276,524 B1 * | 8/2001 | Cerda-Vilaplana et al. | 206/308.1 |

FOREIGN PATENT DOCUMENTS

| | | | |
|---|---|---|---|
| DE | 29701535 U1 | 3/1997 | G11B 23/03 |

(Continued)

OTHER PUBLICATIONS

Japan Office Action of Dec. 24, 2003 for Japanese Application No. 2001-001221, and Translation.

(Continued)

*Primary Examiner*—Jim Foster
(74) *Attorney, Agent, or Firm*—Frommer Lawrence & Haug LLP; William S. Frommer

(57) ABSTRACT

A recording medium holder for accommodating a recording medium which records information is disclosed. The recording medium holder has an accommodating member which forms a first accommodating region being capable of accommodating at least one sheet of the recording medium to be held and a second accommodating region being capable of accommodating at least one recording device for recording relevant data generated in relation to the processing of information by an information processing apparatus. The accommodating member includes a recording medium holding portion for positioning and holding the recording medium to be held in the first accommodating region and a recording device holding portion for positioning and holding the recording device to be held in the second accommodating region.

5 Claims, 13 Drawing Sheets

FOREIGN PATENT DOCUMENTS

| | | | | |
|---|---|---|---|---|
| EP | 0531113 A2 | 3/1993 | .......... | G11B 33/04 |
| JP | 3-98788 | 10/1991 | | |
| JP | 4-32993 | 3/1992 | .......... | B65D 85/57 |
| JP | 5-112383 | 5/1993 | | |
| JP | 05-159594 | 6/1993 | .......... | G11C 19/28 |
| JP | 5-213387 | 8/1993 | .......... | B65D 85/57 |
| JP | 06-156567 | 6/1994 | .......... | B65D 85/57 |
| JP | 3-04172 | 11/1994 | | |
| JP | 3006353 | 11/1994 | .......... | B65D 85/57 |
| JP | 7-323158 | 12/1995 | .......... | A63F 13/10 |
| JP | 08-002572 | 1/1996 | .......... | B65D 85/57 |
| JP | 8-53180 | 2/1996 | | |
| JP | 08-53181 | 2/1996 | .......... | B65D 85/57 |
| JP | 3-025667 | 4/1996 | .......... | B65D 85/57 |
| JP | 08-169488 | 11/1996 | .......... | B65D 85/57 |
| JP | 8-286905 | 11/1996 | | |
| JP | 9-012074 | 1/1997 | .......... | B65D 85/57 |
| JP | 09-22386 | 1/1997 | .......... | G06F 12/14 |
| JP | 11-179048 | 7/1999 | | |
| JP | 11-171274 | 9/1999 | .......... | B65D 85/57 |
| TW | 80110328 | 10/1980 | | |
| TW | 87215404 | 4/1999 | .......... | B65D 85/87 |

OTHER PUBLICATIONS

PCT International Search Report for International Application No. PCT/JP00/05764.

Japanese International Search Report for PCT/JP01/00932.

Taiwan Office Action for Taiwan Application No. 89117273; “Type of Notice: Pre-notice of Rejection”.

Taiwan Publication No. 356130, Published Apr. 11, 1999.

Japan Office Action of Mar. 8, 2005 for Japanese Application No. H11-238986, and English Translation.

* cited by examiner

RECORDING MEDIUM HOLDER AND INFORMATION PROVIDING BODY

This application is a Continuation of application Ser. No. 09/648,017, filed Aug. 25, 2000, U.S. Pat. No. 6,604,635 the disclosure of which is incorporated herein by reference.

FIELD OF THE INVENTION

The present invention relates to a recording medium holder for accommodating a recording medium which stores information to be provided to an information processing apparatus and an information providing body which accommodates the recording medium in the recording medium holder, and more particularly to a recording medium holder which can accommodate a recording device for recording relevant data generated in relation to information processing in the information processing apparatus together with the recording medium and an information providing body which accommodates the recording medium and the recording device in the recording medium holder.

BACKGROUND OF THE INVENTION

Among game apparatus systems, there have been a game apparatus system in which, in accordance with playing of the game, relevant data such as various setting information, instructions against the game generated in response to various manipulations by a player, information indicative of progress of the game and the like are generated. Such a game apparatus system is generally constituted such that a recording device for recording data can be mounted on the game apparatus system. Therefore, when the game is interrupted, the generated relevant data can be recorded in the recording device. Accordingly, once the relevant data is recorded in the recording device, with the use of the relevant data recorded in the recording device, at the time of playing the game again, it is unnecessary to start the game again from the beginning of the game and the game can be continued from the state at a point of time of interruption. Further, to start the game again using a different game device, the game can be started from the interrupted state with the use of the relevant data.

Incidentally, a user of the game device is apt to purchase various kinds of game software and enjoy them. In this case, the recording of the relevant data becomes necessary for each game. However, the recording capacity of the recording device is limited and hence, the data content of the relevant data which can be recorded is limited. Accordingly, to prevent an occurrence of a trouble that the recording of the relevant data becomes impossible at the time of interruption of the game, it becomes necessary to always prepare a new recording device. Further, to enjoy a large number of games, as a result, a large number of recording devices for recording the relevant data corresponding to various game softwares are required. To cope with such a situation, it becomes necessary to prepare and store the recording devices corresponding to game softwares respectively.

However, this kind of recording device is generally offered to the user from a game apparatus system maker as an accessory of the game apparatus system or an option. On the other hand, game software used in the game apparatus system is offered to the user from a software maker who produces such game software in a form of a recording medium such as a CD-ROM which records the software. That is conventionally, the recording device has been offered irrelevant to the recording medium which records the software. Accordingly, the preparation of the recording devices and the storage of the recording devices which record the relevant data in relation to the corresponding game software must be performed by the user himself or herself.

However, this kind of game apparatus system is used in a wide age groups from infants to elderly people or the game is used by a plurality of members in a family. Accordingly, it becomes necessary that the preparation and the storage of the recording device can be performed easily by anybody with as least special burden as possible.

Such a problem is not limited to game software. For example, the game apparatus system is originally an information processing apparatus and hence, the game apparatus system can be used in other purposes other than games such as the reproduction of images, the reproduction of sounds, the communication or other information processing, for example. In such a case, the recording device can be used for recording relevant data generated along with performing of various processing. Here, the above-mentioned problem also arises. Further, In the case that the game is performed using a personal computer, then relevant data generated along with performing of the game is recorded and the game is started again using the game apparatus system, this problem also arises. Further, in a reverse case, that is, in the case relevant data generated in the game apparatus system is recorded and the game is performed on a personal computer using the relevant data, a similar problem arises.

SUMMARY OF THE INVENTION

Accordingly, it is an object of the present invention to provide a recording medium holder which can facilitate storage of a recording device while maintaining the relevance with information on corresponding software or the like without compelling a user to bear any special burden.

Further, it is another object of the present invention to provide an information providing body which can facilitate the preparation and storage of the recording device while maintaining the relevance with information on corresponding software or the like without compelling a user to bear any special burden, and which can provide the recording device in relation to a recording medium which records information.

According to one aspect of the present invention, there is provided a recording medium holder for accommodating a recording medium which records information to be provided to an information processing apparatus, comprising:

an accommodating member forming a first accommodating region for accommodating at least one sheet of the recording medium to be held and a second accommodating region for accommodating at least one recording device for recording data, the accommodating member having a recording medium holding portion for holding the recording medium to be held in the first accommodating region and a recording device holding portion for holding the recording device to be held in the second accommodating region.

According to the second aspect of the present invention, there is provided an information providing body for providing a game software for performing a game with a game apparatus system, comprising:

a recording medium which records the game software to be provided to the game apparatus system;

a recording device for recording data; and a recording medium holder for accommodating the recording medium and the recording device, the recording medium holder having an accommodating member which forms a first accommodating region for accommodating at least one sheet of the recording medium and a second accommodating region for accommodating at least one recording device, the accommodating member having a recording medium holding portion for holding the recording medium in the first accommodating region and a recording device holding portion for holding the recording device in the second accommodating region, wherein the recording medium is held in the recording medium holding portion and the recording device is held in the recording device holding portion.

According to the third aspect of the present invention, there is provided an information providing body for providing information to an information processing apparatus, comprising:

a recording medium which records the information to be provided to the information processing apparatus;

a recording device for recording data; and a recording medium holder for accommodating the recording medium and the recording device, the recording medium holder having an accommodating member which forms a first accommodating region for accommodating at least one sheet of the recording medium and a second accommodating region for accommodating at least one recording device, the accommodating member having a recording medium holding portion for holding the recording medium in the first accommodating region and a recording device holding portion for holding the recording device in the second accommodating region, wherein the recording medium is held in the recording medium holding portion and the recording device is held in the recording device holding portion.

According to the fourth aspect of the present invention, there is provided an information providing body for providing a software to be executed to an information processing apparatus, comprising:

a recording medium which records software to be provided to the information processing apparatus;

a recording device for recording data; and a recording medium holder for accommodating the recording medium and the recording device, the recording medium holder having an accommodating member which forms a first accommodating region for accommodating at least one sheet of the recording medium and a second accommodating region for accommodating at least one recording device, the accommodating member having a recording medium holding portion for holding the recording medium in the first accommodating region and a recording device holding portion for holding the recording device in the second accommodating region, and wherein the recording medium is held in the recording medium holding portion and the recording device is held in the recording device holding portion.

According to the fifth aspect of the present invention, there is provided an information providing body for providing a game software for performing a game with a game apparatus system, comprising:

a recording medium which records the game software to be provided to the game apparatus system and a recording medium holder for accommodating the recording medium, the recording medium holder having an accommodating member which forms a first accommodating region for accommodating at least one sheet of the recording medium and a second accommodating region for accommodating at least one recording device, the accommodating member having a recording medium holding portion for holding the recording medium in the first accommodating region and a recording device holding portion for holding the recording device at the second accommodating region, wherein the recording medium is held in the recording medium holding portion.

According to the sixth aspect of the present invention, there is provided an information providing body for providing information to an information processing apparatus, comprising:

a recording medium which records the information to be provided to the information processing apparatus and a recording medium holder for accommodating the recording medium and a recording device, the information providing body includes an accommodating member which forms a first accommodating region for accommodating at least one sheet of the recording medium and a second accommodating region for accommodating at least one recording device for recording data are formed, the accommodating member having a recording medium holding portion for holding the recording medium in the first accommodating region and a recording device holding portion for holding the recording device in the second accommodating region, wherein the recording medium is held in the recording medium holding portion.

According to the seventh aspect of the present invention, there is provided an information providing body for providing a software to be executed to an information processing apparatus, comprising:

a recording medium which records the software to be provided to the information processing apparatus and a recording medium holder for accommodating the recording medium and a recording device, the recording medium holder includes an accommodating member which forms a first accommodating region for accommodating at least one sheet of the recording medium and a second accommodating region for accommodating at least one recording device for recording data, the accommodating member having a recording medium holding portion for holding the recording medium in the first accommodating region and a recording device holding portion for holding the recording device in the second accommodating region, wherein the recording medium is held in the recording medium holding portion.

BEST MODE FOR CARRYING OUT THE INVENTION

Embodiments of the present invention are respectively explained hereinafter in conjunction with attached drawings. The following embodiments explain a case in which the present invention is applied to a recording medium holder which accommodates a recording medium recording game software and a recording device being used for recording relevant data generated along with executing of the game and a case in which the present invention is applied to an information providing body are explained. It is needless to say that objects to which the recording medium holder and the information providing body of the present invention are applied are not limited to the recording medium which records game software or the information providing body which accommodates and provides such recording medium.

Figure 17:
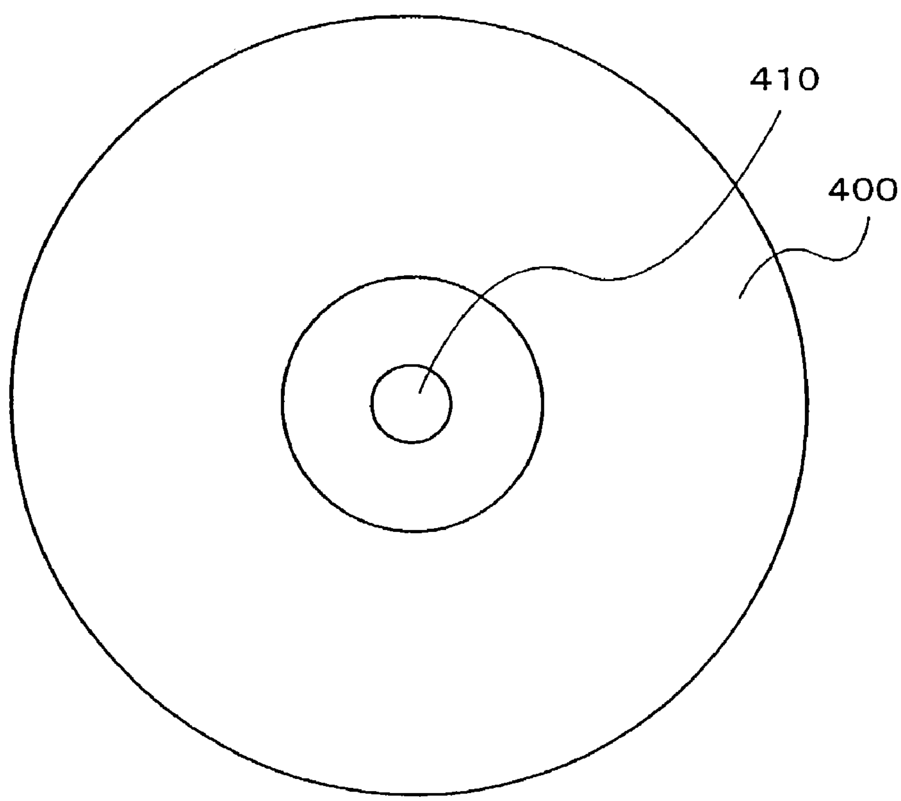
FIG. 17 is a perspective view showing one example of a disc type recording medium accommodated in the recording medium holder of the present invention.

In the embodiments of the present invention, as an example of a recording medium which is accommodated in the recording medium holder, the present invention is intended for a disc-type recording medium 400 shown in FIG. 17. Examples of the recording medium include a CD, a DVD and the like. As shown in FIG. 17, the disc-type recording medium 400 has a through hole 410 on the center thereof.

Figure 13:
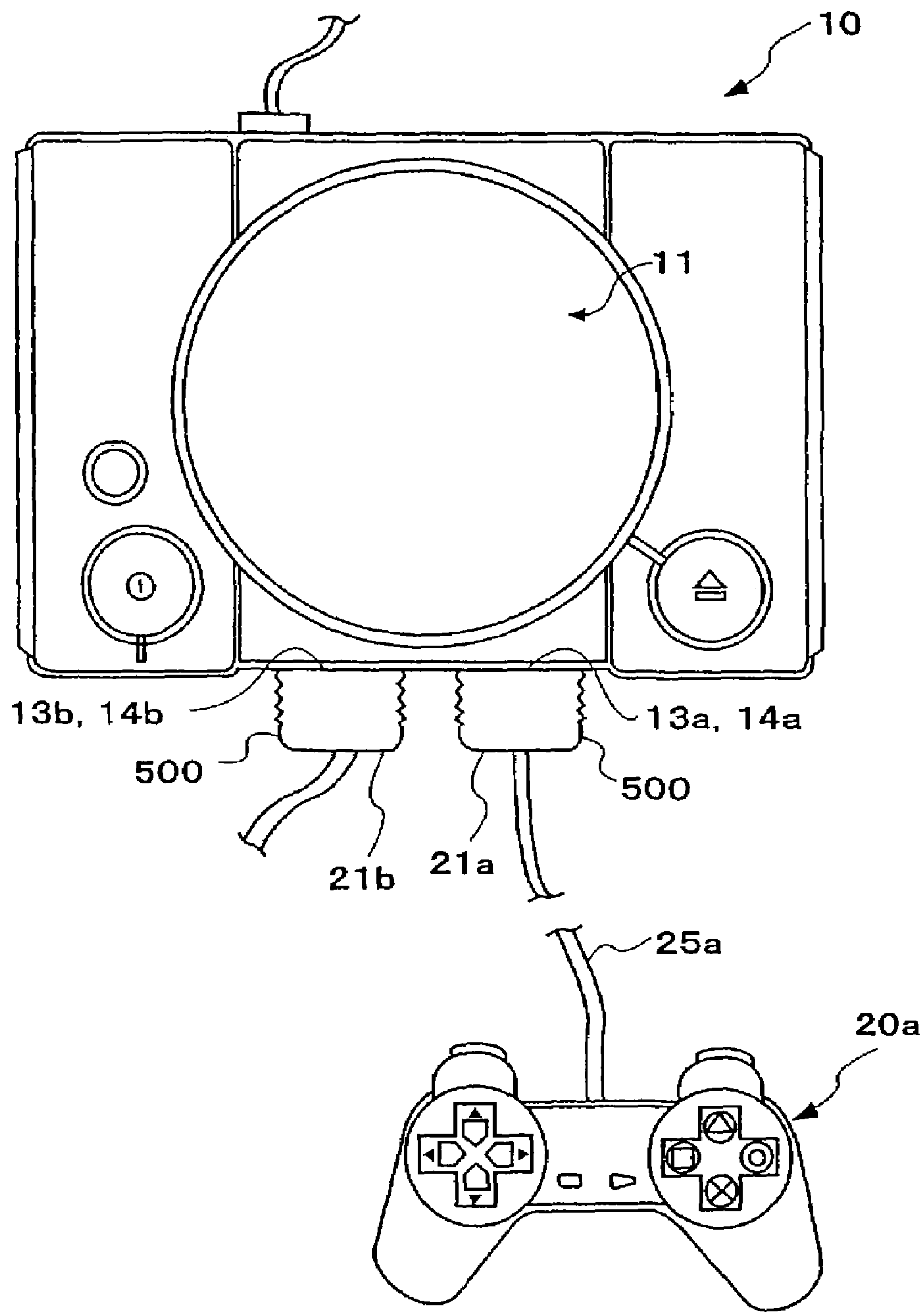
FIG. 13 is a plan view showing one example of a game apparatus system which includes a game apparatus and a controller while using a recording medium and a recording device.

This disc-type recording medium 400 is mounted on a disc-type recording medium reproducing part 11 of a game apparatus 10 shown in FIG. 13. Then, software stored in the recording medium 400 is read into the game apparatus 10 for the execution of a game.

A controller 20*a* with which a player progresses the game by performing various operations against the game apparatus system is connected to a controller connecting part 14*a* or 14*b* of the game apparatus 10 by way of a plug portion 21*a* or 21*b*. Further, as a monitoring device, a television receiver, not shown in the drawing, is connected to the game apparatus 10, for example. A plural sets of, for example, two sets of controllers may be connected to the game apparatus 10.

On the other hand, as the recording device which is accommodated in the recording medium holder, a rewritable non-volatile memory may be named, for example. In addition, other exemplary recording device includes a circuit component for controlling the reading and writing of the rewritable non-volatile memory.

Figure 16:
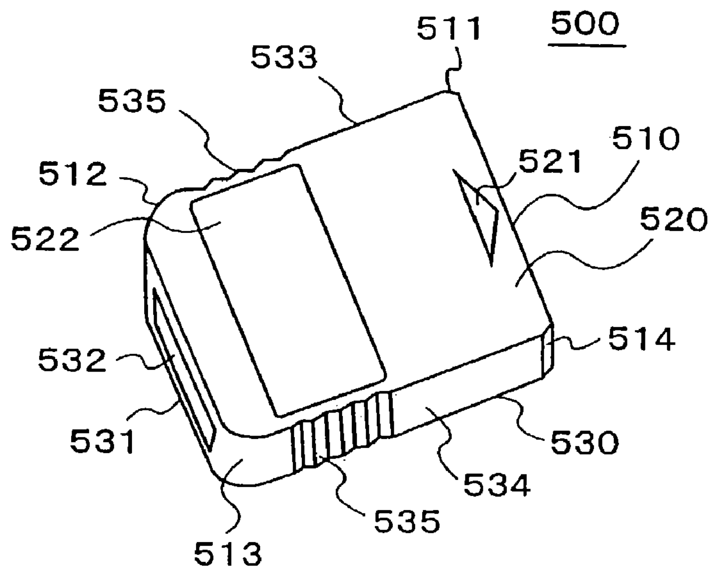
FIG. 16 is a perspective view showing one example of the recording device accommodated in the recording medium holder of the present invention.

In FIG. 16, as an example of the recording device, an example of a memory card 500 having a non-volatile memory is shown. The memory card 500 includes a card case 510 and a board accommodated therein and mounts a memory chip, a control circuit, a wiring, a connecting terminal and the like thereon (none of them shown in the drawings).

The card case 510 has a generally flattened rectangular parallelepiped shape and has four corner portions 511–514 as seen from the upper surface side. The corner portions 512 and 513 at the proximal end side have a curved surface shape. Further, although not shown in the drawing, the distal end side of the card case 510 has an opening and the above-mentioned connecting terminals are arranged in the inside of the opening. A triangular mark 521 showing an inserting direction for mounting the card case 510 in the game apparatus is attached to the distal end side of an upper surface 520 of the card case 510. On the other hand, a label-attaching portion 522 is provided to a portion of the upper surface 520 adjacent to the proximal end of the card case 510. A label is attached to this portion and the name of corresponding software is described on the label.

Among side surfaces 530 of the card case 510, a label attaching portion 532 is formed on a proximal-end-side of side surface 531. Further, on the side surfaces 533, 534 which are parallel to an inserting direction, concave-convex portions 535 having a waveform pattern are formed adjacent to the proximal end side of the card case 510. In inserting or removing operation of the recording device 500, at the time of pinching the recording-device 500 with fingers the concave-convex portions 535 indicate the position to be pinched with fingers to the user and also function as slip preventing means.

Figure 14:
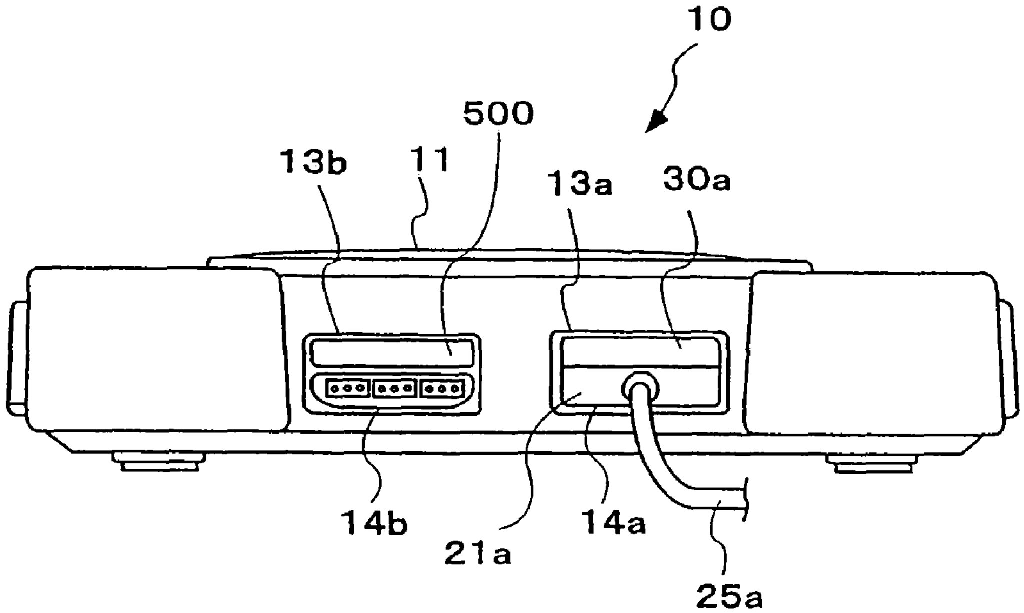
FIG. 14 is a front view of the game apparatus.
Figure 15:
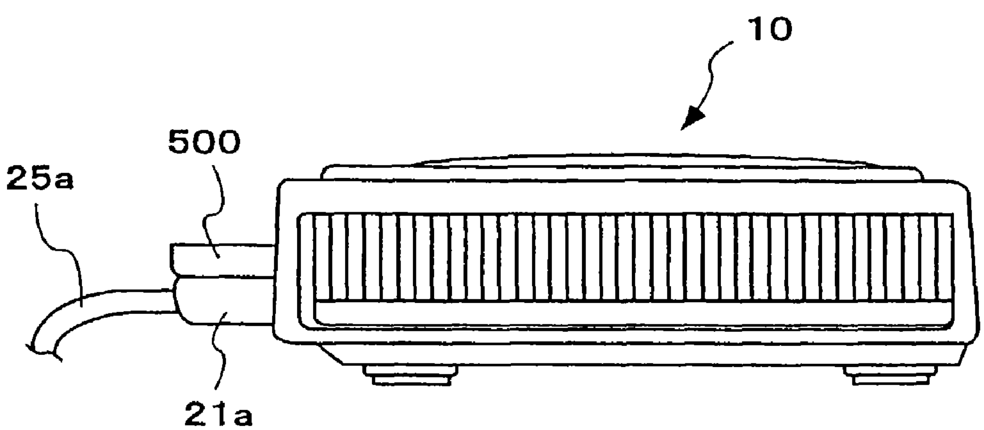
FIG. 15 is a side view of the game apparatus.

As shown in FIGS. 13 to 15, this recording device 500 is connected to the game apparatus 10 by inserting the recording device 500 into a recording apparatus receiving part 13*a* or 13*b* formed on the game apparatus 10.

Then, the recording medium holder according to this embodiment is explained in conjunction with attached drawings. FIGS. 1 to 5 show one example of the recording medium holder according to the first embodiment of the present invention.

Figure 1:
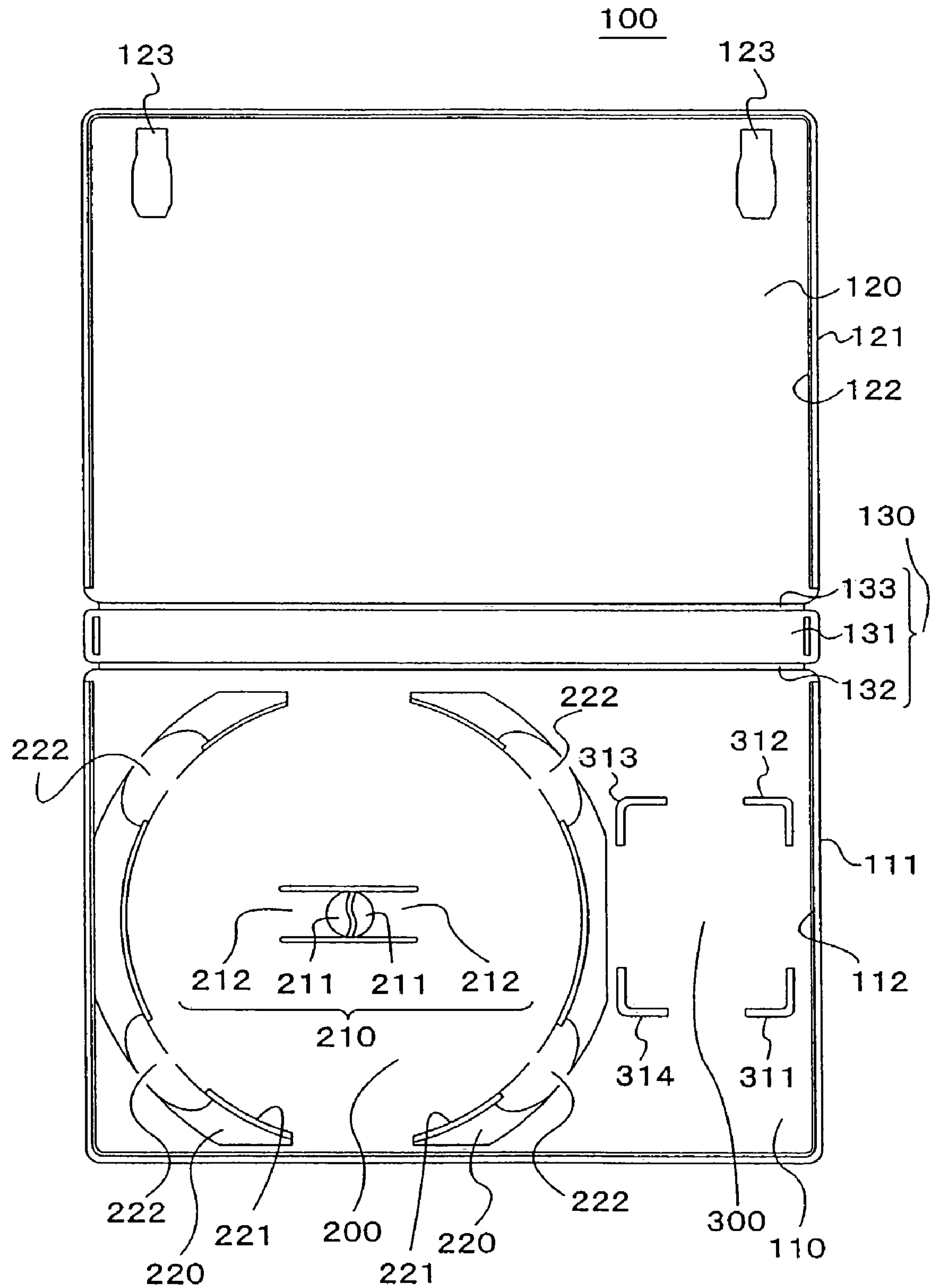
FIG. 1 is a plan view showing one example of a recording medium holder according to the first embodiment of the present invention in an opened state.
Figure 2:
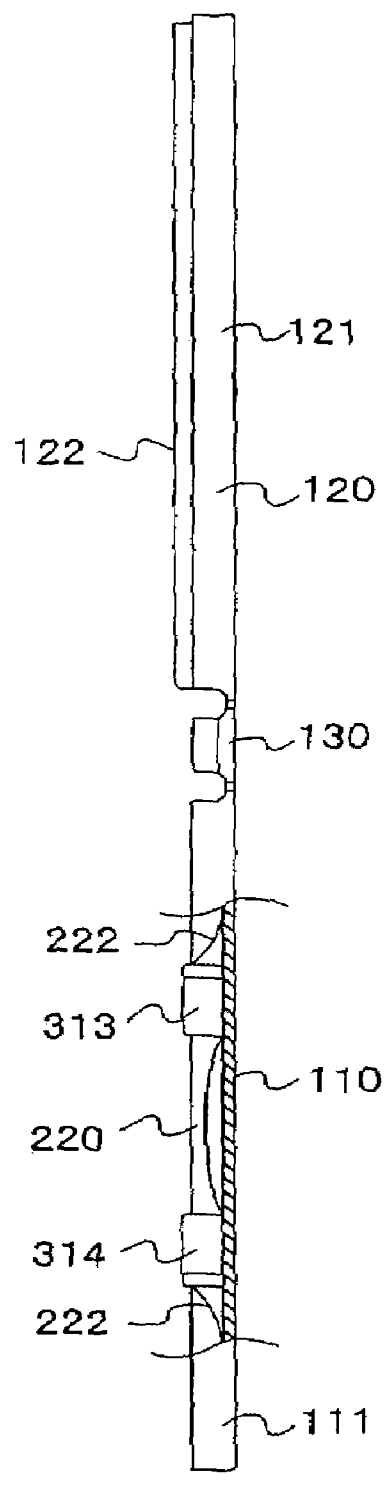
FIG. 2 is a side view showing a cross section with a part broken away of the recording medium holder according to the first embodiment of the present invention.
Figure 3:
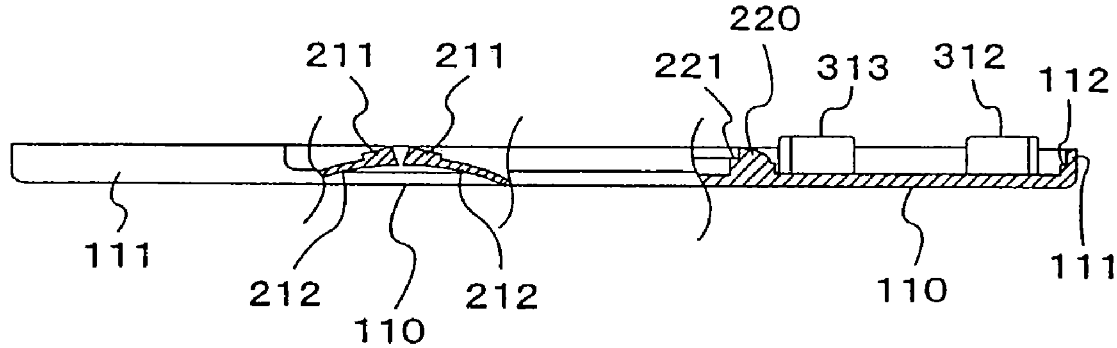
FIG. 3 is a front view showing a cross section with a part broken away of the recording medium holder according to the first embodiment of the present invention.

As shown in FIGS. 1 to 3 the first embodiment of the present invention includes an accommodating member 100 which has a first accommodating region 200 accommodating at least one sheet of recording medium and a second accommodating region 300 accommodating at least one recording device which records relevant data generated in relation to the execution of the game with the game apparatus system thereon.

Figure 4:
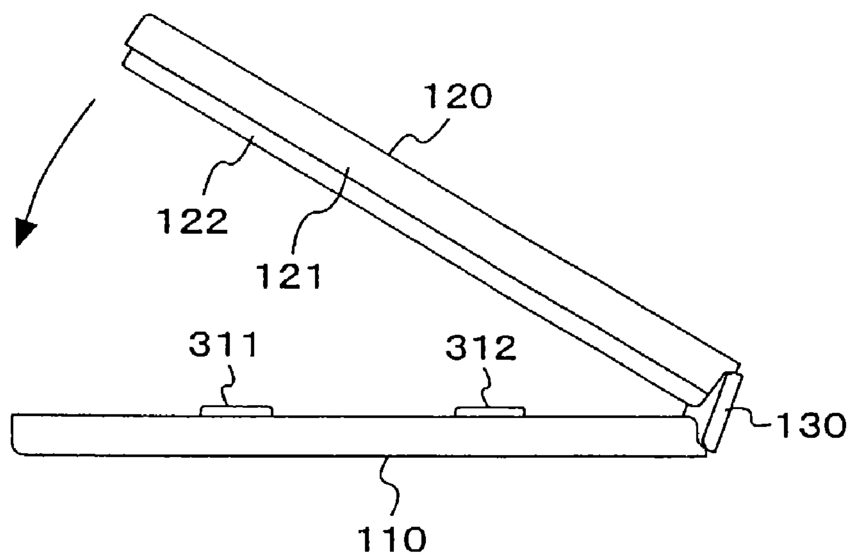
FIG. 4 is a side view showing a folding step of the recording medium holder according to the first embodiment of the present invention.

The accommodating member 100 is constituted by a first member 110, a second member 120 and a connecting member 130. In this embodiment, the first member 110 and the second member 120 are connected by way of the connecting member 130. Further, these members 110, 120 and 130 can be integrally formed using a synthetic resin material, for example. This accommodating member 100 uses the first member 110 and the second member 120 as front and rear covers and uses the connecting member 130 as a back cover and the first member 110 and the second member 120 are foldable in a form that they face each other. That is, the accommodating member 100 has a folder shape. FIG. 4 shows a folding step of the accommodating member 100. In a space defined by making the first member 110 and the second member 120 face each other, the recording medium 400 and the recording device 500 are accommodated.

The first accommodating region 200 and the second accommodating region 300 are arranged in the first member 110. With respect to the first accommodating region 200 and the second accommodating region 300, as shown in FIG. 1, along the longitudinal direction of the first member 110, the first accommodating region 200 is arranged at one side of the first member 110 and the second accommodating region 300 is arranged at the other side of the first member 110. Since the first accommodating region 200 and the second accommodating region 300 are arranged in the first member 110, the recording medium 400 and the recording device 500 (see FIG. 5) can be mounted on or dismounted from the same plane and hence, the mounting and dismounting operation becomes easy.

Further, the first member 110 is provided with frame portions 111 at three sides of the periphery of a plate-like member on the inner sides of the frame portions 111, stepped portions 112 are formed. When the second member 120 is folded to the first member 110 such that the second member 120 overlaps the first member 110, in spaces defined by the stepped portions 112, protruding sides 122 described below and formed on inner sides of frame portions 121 of the second member 120 are accommodated. The other side of the first member is connected to the connecting member 130.

The first accommodating region 200 includes a holding mechanism 210 for holding the disc-type recording medium 400 to be mounted therein and a frame portions 220 which is formed along and in the vicinity of the outer periphery of the disc-type recording medium 400 when the disc-type recording disc 400 is mounted. A recording medium holding portion is constituted by the holding mechanism 210 and the frame portion 220.

The holding mechanism 210 includes a pair of pressure contact portions 211 which are brought into pressure contact with the inner periphery of the central hole 410 of the disc-type recording medium 400 for holding the disc-type recording medium 400 and a pair of supporting portions 212 for supporting the pressure contact portions 211. The supporting portions 212 support the pressure contact portions 211 in a cantilever form and simultaneously are biased to push the pressure contact portions 211 upwardly. Due to such a provision, a pair of pressure contact portions 211 are biased such that the distance between them is expanded. Accordingly, the pressure contact portions 211 are respectively brought into pressure contact with the inner periphery of the center hole 410 and hence, the disc-type recording medium 400 is held by the pressure contact portions 211 (see FIG. 5). Further, when the pressure contact portions 211 are pressed down with a finger or the like, the distance between the pressure contact portions 211 is narrowed so that the pressure contact of the pressure contact portions 211 to the center hole 410 is released. Therefore the disc-type recording medium 410 can be easily dismounted or removed. The holding mechanism 210 is not limited to one described in this embodiment and may be any known holding mechanism which is used for holding this kind of disc-type recording medium 400.

The frame portions 220 are formed of a pair of arcuate protruding portions which are arranged such that they face each other while sandwiching the disc-type recording medium 400 in the insides thereof. The frame portions 220 are integrally formed with the first member 110 using the same material. In the insides of the frame portions 220, stepped portions 221 are formed and these stepped portions 221 support the periphery of the disc-type recording medium 400 to be mounted. In the insides of these frame portions 220, an accommodating region for the disc-type recording medium 400 is provided (see FIG. 5). A plurality of notched portions 222 are formed in the frame portions 220 so as to form a space used for removing the mounted disc-type recording medium 400.

In the second accommodating region 300; protruding portions 311–314 which constitute a recording device holding portion for holding the recording device 500 are arranged. In the example shown in FIG. 1, the protruding portions 311–314 are respectively formed in an L-shape as seen from an upper surface. In a region surrounded by the protruding portions 311–314, the recording device 500 is mounted. Here, the protruding portions 311–314 are respectively brought into pressure contact with portions of the side surface 530 of the recording device 500 so as to prevent the removal of the recording device 500. In this embodiment, these protruding portions 311–314 are brought into contact with corresponding corner portions 511–514 (see FIG. 16) of the recording device 500 so as to hold the recording device 500 (see FIG. 5).

Due to such a constitution, compared to a case that the total peripheral surface of the side surface 530 of the recording device is surrounded, an advantage that the manufacturing of the accommodating member 100 is performed easily is obtained. Further, at the time of taking out the recording device 500 which is mounted, fingers can be easily engaged with the side surface 530 and hence, an advantage that the removal of the recording device can be facilitated is obtained. Further, in mounting the recording device 500, the recording device 500 can be mounted while holding the side surface 530 of the recording device 500 with fingers and hence, the mounting is also facilitated. Particularly, in the case that the recording device used for game is accommodated, an advantage that the recording device can be easily taken out by players of a wide age group is obtained.

Further, the protruding portions 311–314 may be formed such that recording device contact surfaces formed on the upper portion side of the protruding portions 311–314 are positioned more inwardly than the proximal portion of the protruding portions 311–314. For example, the protruding portions 311–314 are formed such that they are inclined inwardly. Due to such a constitution, a force to hold the recording device 500 can be increased so that the recording device 500 can be held more assuredly. Further, even when the mounting and dismounting of the recording device 500 is repeated, irrespective of a large number of mounting and dismounting of the recording device 500, the holding force brought about by the protruding portions 311–314 can be maintained, thus increasing the durability of the protruding portions 311–314.

Further, in this embodiment, the protruding portions 311–314 are brought into pressure contact with the side surface of the recording device 500. However, the present invention is not limited to such a constitution. For example, it may be structured that inwardly directing engaging portions are formed on the upper portions of the protruding portions 311–314. Due to such a structure, the engaging portions can be engaged with the periphery of the upper surface of the mounted recording device 500 and hence, the recording device 500 can be assuredly held.

With respect to the second member 120, as mentioned previously, the protruding side 122 inside of the frame portion 121 is fitted into the inside of the frame portion 111 of the first member 110 at a position of stepped portion 112 present at the inner side of the frame portion 111 of the first member 110 and a space for accommodating the recording medium 400 and the recording device 500 is formed at the inner sides of the first member 110 and the second member 120. Further, in this embodiment, the second member 120 also works as a lid covering the first member 110. Still further, in this embodiment, the second member 120 is provided with a pair of clips 123. With these clips 123 a manual 600 (see FIG. 5) or the like explaining the manner of playing the game with the game software recorded in the recording medium 400 can be held.

The connecting member 130 is interposed between the first member 110 and the second member 120 and is respectively integrally connected to these members 110, 120. The connecting member 130 is constituted by a portion of the back plate 131 which becomes a back cover when the accommodating member 100 is folded and hinge portions 132, 133 which function as hinges.

The connecting member 130 may be provided to a side of the first member 110 which intersects the above-mentioned position at a right angle and may be connected to the first member 110 at the position. Further, the connecting portions 130 may be provided to two parallel sides and the second member consists of two members, thus constituting the second member having a double-leafed hinged door structure. Further, two sheets of second members may be closed from left and right in an overlapped manner.

The recording medium holder according to this embodiment having the above-mentioned constitution can accommodate the disc-type recording medium 400 in the first accommodating region 200 of the first member 110. Further, the second accommodating region 300 is disposed adjacent to the first accommodating region 200 and the recording device 500 having a flattened rectangular parallelpiped shape can be accommodated in the second accommodating region 300. When the disc-type recording medium 400 is mounted in the first accommodating region 200, the disc-type recording medium 400 is held by the holding mechanism 210. Further, when the recording device 500 is mounted in the second accommodating region 300, the protruding portions 311–314 are brought into pressure contact with the corner portions 511–514 of the recording device 500 so that the recording device 500 is held. This state is shown in FIG. 5.

In the above-mentioned manner, a user of the game software can accommodate or store the disc-type recording medium 400 and the recording device 500 in the same holder. As a result, the recording device 500 which records the data relevant to the software recorded in the recording medium 400 can be stored by accommodating them in the same holder. In this manner, according to this embodiment, it becomes possible to store the recording device 500 in the condition that the relevance between the recording device 500 and the recording medium which records the corresponding software is maintained without compelling the user of the game software to bear any special burden. Particularly, by attaching the label which records the name of the corresponding software to the label attaching portion 522 of the recording device 500, the storage of the recording device 500 can be performed more assuredly.

Further, at the time of starting the game again, the recording medium 400 and the recording device 500 are taken out from the same accommodating member 100 and are mounted in the game apparatus 10 (see FIG. 13). In this manner, the game can be started again from the state that the game is interrupted. Here, with respect to mounting the recording medium 400 and the recording device 500 in the game apparatus system in the state that their corresponding relationship is maintained, the user is not forced to pay a special attention.

Figure 5:
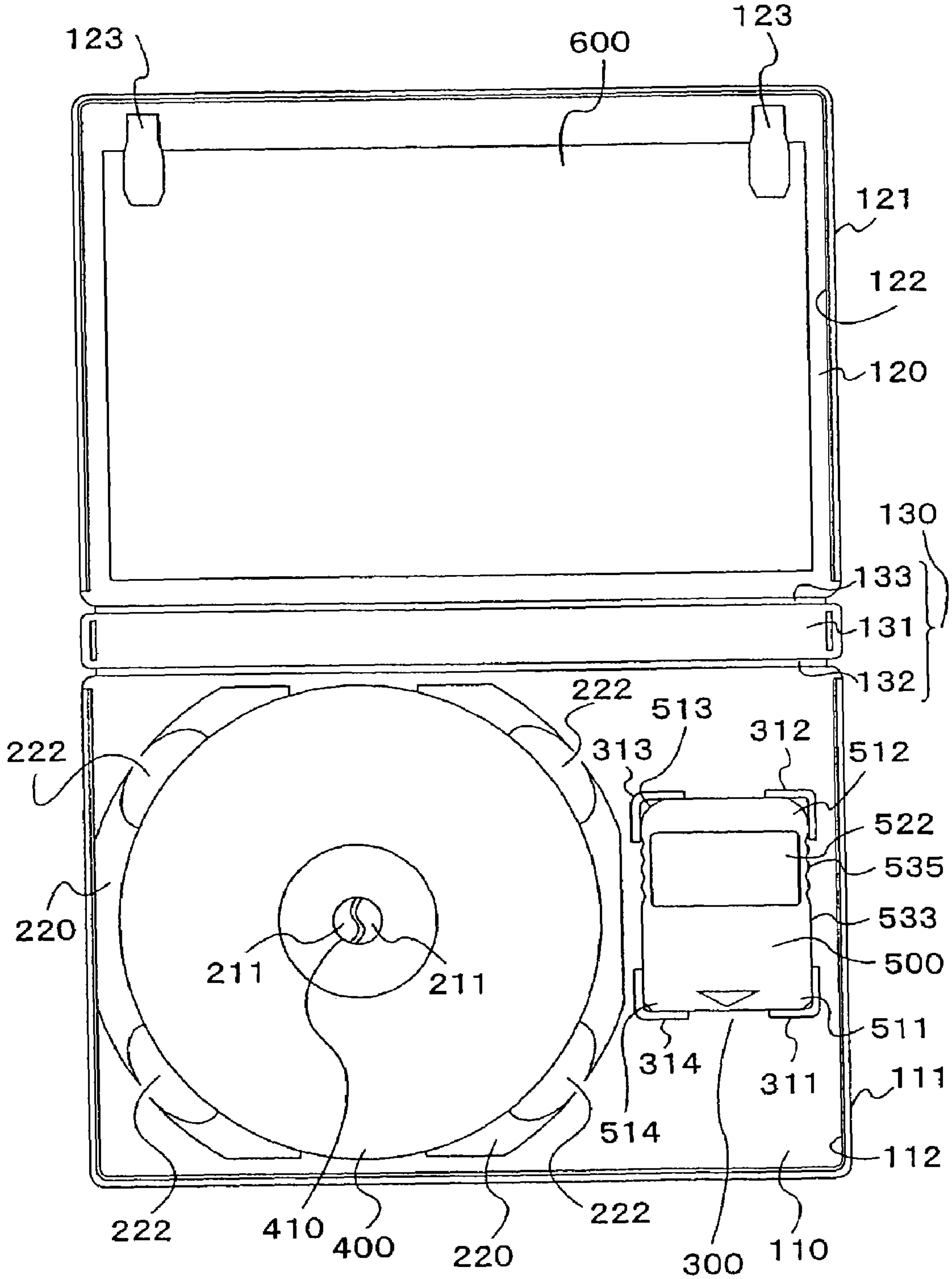
FIG. 5 is a plan view showing one example of an information providing body according to the second embodiment of the present invention.

The example shown in FIG. 5 shows the constitution of the information providing body according to the second embodiment of the present invention. The information providing body shown in FIG. 5 is a body constituted by accommodating the disc-type recording medium 400 and the recording device 500 in the previously-mentioned information holder 100 shown in FIG. 1. The structure of the recording medium holder used in this embodiment is as same as the one shown in FIG. 1. Accordingly, the repeated explanation will be omitted.

According to this embodiment, as shown in FIG. 5, a software maker can respectively mount the recording medium 400 which records information to be provided, for example, the game software and the recording device 500 for recording the data generated in relation to the game software in the first accommodating region 200 and the second accommodating region 300 corresponding to them and then can ship the information providing body. In shipping, the manual 600 is further attached to the second member 120 by clamping the manual 600 with the clips 123. In such a state, as shown in FIG. 4, the accommodating member 100 is folded at the position of the connecting member 130 and then the second member 120 is fitted into the first member 110 to form the information providing body into a product configuration such as a folder shape or a book shape.

With such an information providing body, a software maker can provide information (game software in this embodiment) to a user of the game software. Here, the user can assuredly obtain the recording device which is used in relation to the software at a point of time that the user purchases the software without preparing the recording device separately. Accordingly, the occurrence of the state that the user cannot record data since he forgets to purchase the recording device can be obviated. Further, after using the software, the user of the game software removes the recording medium 400 and the recording device 500 from the game apparatus and respectively mounts them in the first accommodating region 200 and the second accommodating region 300 correspondingly, thus accommodating them in the accommodating member 100. Accordingly, the recording medium 400 and the recording device 500 can be stored in the state that the software and the data are made relevant to each other. That is, only by respectively returning the recording medium 400 and the recording device 500 to the accommodating member 100 from which they were taken out, both of them can be stored in the state that they are made relevant to each other. Accordingly, in this embodiment, the user is not forced to pay a special attention in order to maintain the relevance between the recording medium and the recording device. Further, with respect to the recording medium in which the game software is recorded, at the time of starting the game again, the game can be continued using the recording medium 400 and the recording device 500 in the same manner as described for the above-mentioned recording medium holder 100.

The above-mentioned performances can be more assuredly obtained when the software maker preliminarily attaches an indication showing the correspondence of the recording device 500 with the recording medium 400 to the label attaching portion 522 of the recording device 500.

By providing the information to the user in a form that the recording medium and the recording device are accommodated in one recording medium holder, the recording medium and the recording device which have conventionally been separately packed can be provided in one package. Accordingly, compared to the prior art which required respective packaging materials for the recording medium and the recording device, the present invention requires only one packing material and hence, the packaging cost can be reduced. Further, an amount of packing material which will be wasted can be also reduced.

Further, since both of the recording medium and the recording device can be accommodated in one recording medium holder, compared to a case that they are stored in the warehouse separately or they are stored separately, there is an advantage that the storage or storage space can be reduced.

Although the example in which both of the recording medium and the recording device are accommodated in the recording medium holder in the above-mentioned second embodiment is described, the present invention is not limited to such an example. For example, it may be possible to provide a product in the state that the information providing body accommodates only the recording medium and the recording device is not accommodated in the second accommodating region. That is, the information providing body may be in the state that the recording device 500 is not mounted in the second accommodating region 300 in FIG. 5. In this case, at least an advantage similar to the advantage obtained by the above-mentioned first embodiment can be obtained.

Subsequently, various modifications with respect to the second accommodating region 300 in the above-mentioned embodiments are explained in conjunction with FIGS. 6 to 9. Various modifications have basically the same structure as the accommodating member 100 shown in FIG. 1. However, they differ with respect to the structure of the second accommodating region 300. Accordingly, parts identical with those shown in FIG. 1 are denoted by the same numerals. With respect to these parts, the explanation thereof becomes the repetition of the explanation for the first embodiment shown in FIG. 1 and hence, the explanation is omitted here.

Figure 6:
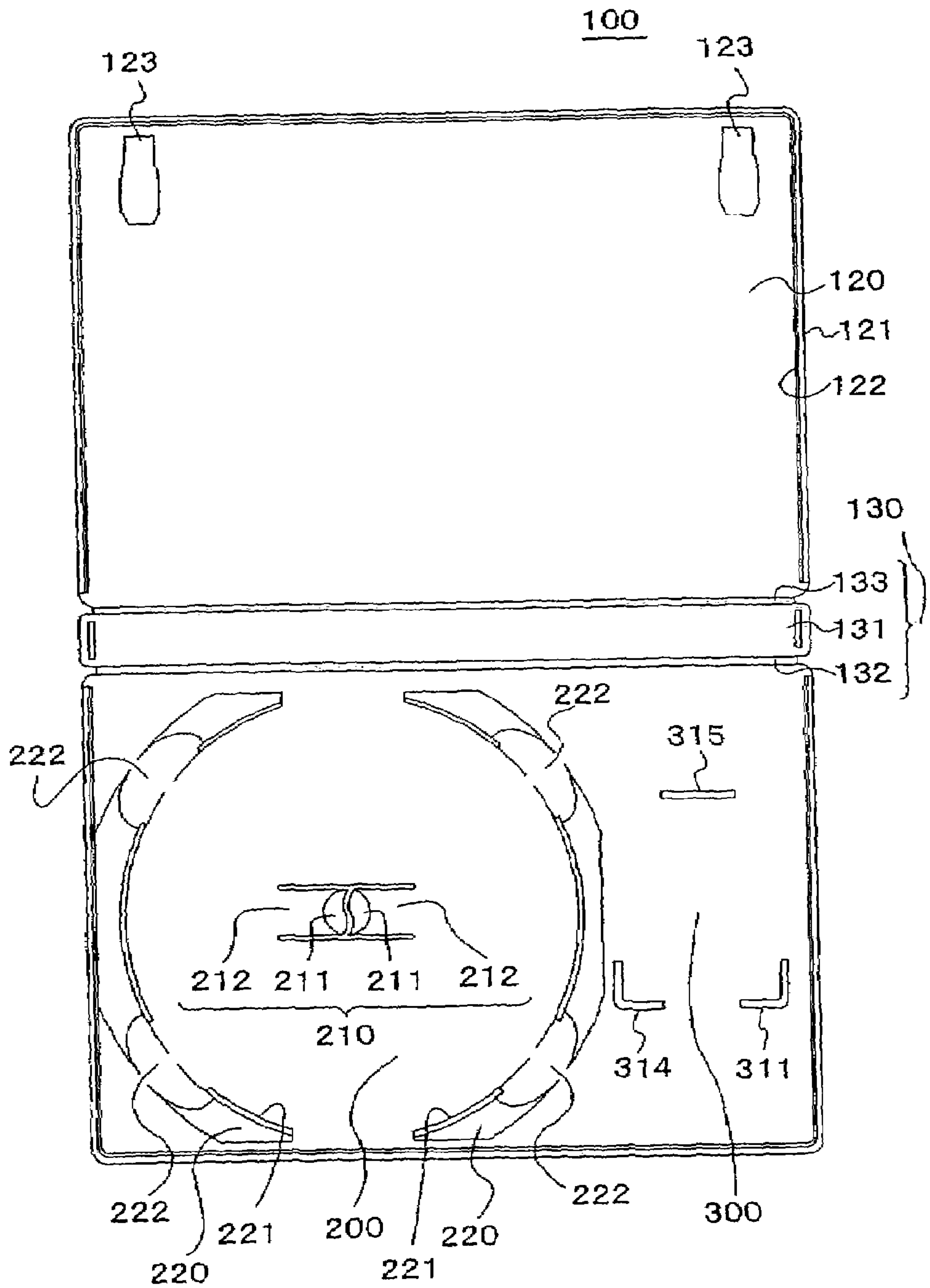
FIG. 6 is a plan view showing another example of a recording device holding portion in the recording medium holder according to the first embodiment of the present invention.

An example shown in FIG. 6 is constituted such that on the second accommodating region 300 which mounts a recording device 500, L-shaped protruding portions 311, 314 and a straight protruding portion 315 are formed so as to hold the recording device 500. The protruding portions 311, 314 have the same structure as the protruding portions 311, 314 of the above-mentioned first embodiment. On the other hand, the protruding portion 315 has a planar plate structure to be brought into pressure contact with a distal-end-side side surface 531 of the recording device 500. In this example, as in the case of the first embodiment, by pinching the side surfaces 533, 534 of the recording device 500 with fingers, the recording device 500 can be easily mounted and dismounted.

Figure 7:
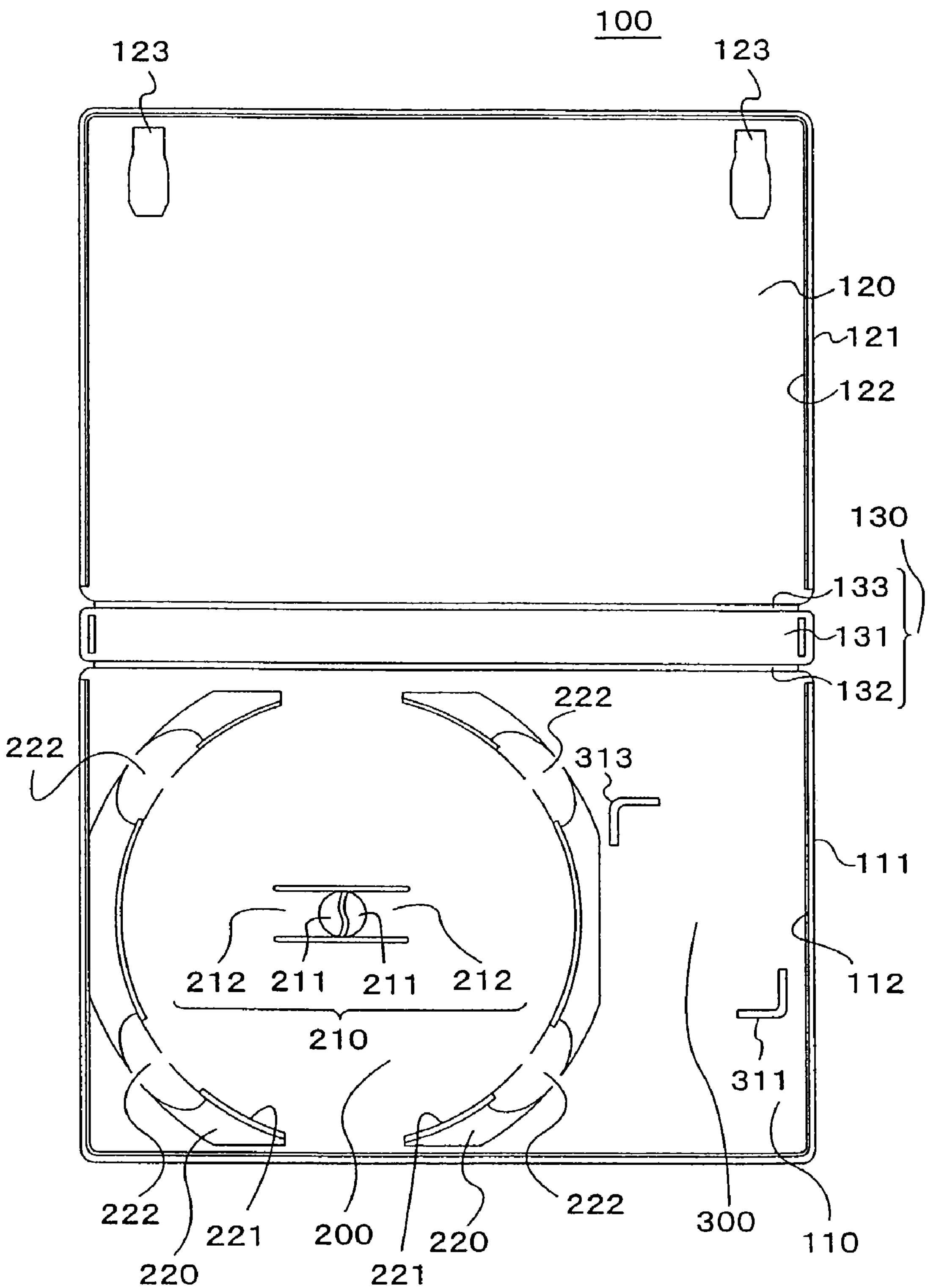
FIG. 7 is a plan view showing another example of a recording device holding portion in the recording medium holder according to the first embodiment of the present invention.

An example shown in FIG. 7 is an example in which among the protruding portions 311–314 formed on the second accommodating region shown in FIG. 1, a pair of protruding portions 311, 313 positioned on a diagonal line are formed.

It is needless to say that the protruding portions 312, 314 can be selectively mounted among the protruding portions 311–314 in FIG. 1. In any case, as in the case of the protruding portions 311, 313, the corner portions 511, 513 on the diagonal line of the recording device 500 are brought into pressure contact with and held by two L-shaped protruding portions 311, 313 arranged on a diagonal line. Accordingly, with the small number of protruding portions, the recording device 500 can be held. Although the mounting and dismounting of the recording device 500 can be performed substantially in the same manner as FIG. 1, such operations can be carried out easier since the restriction is smaller.

Figure 8:
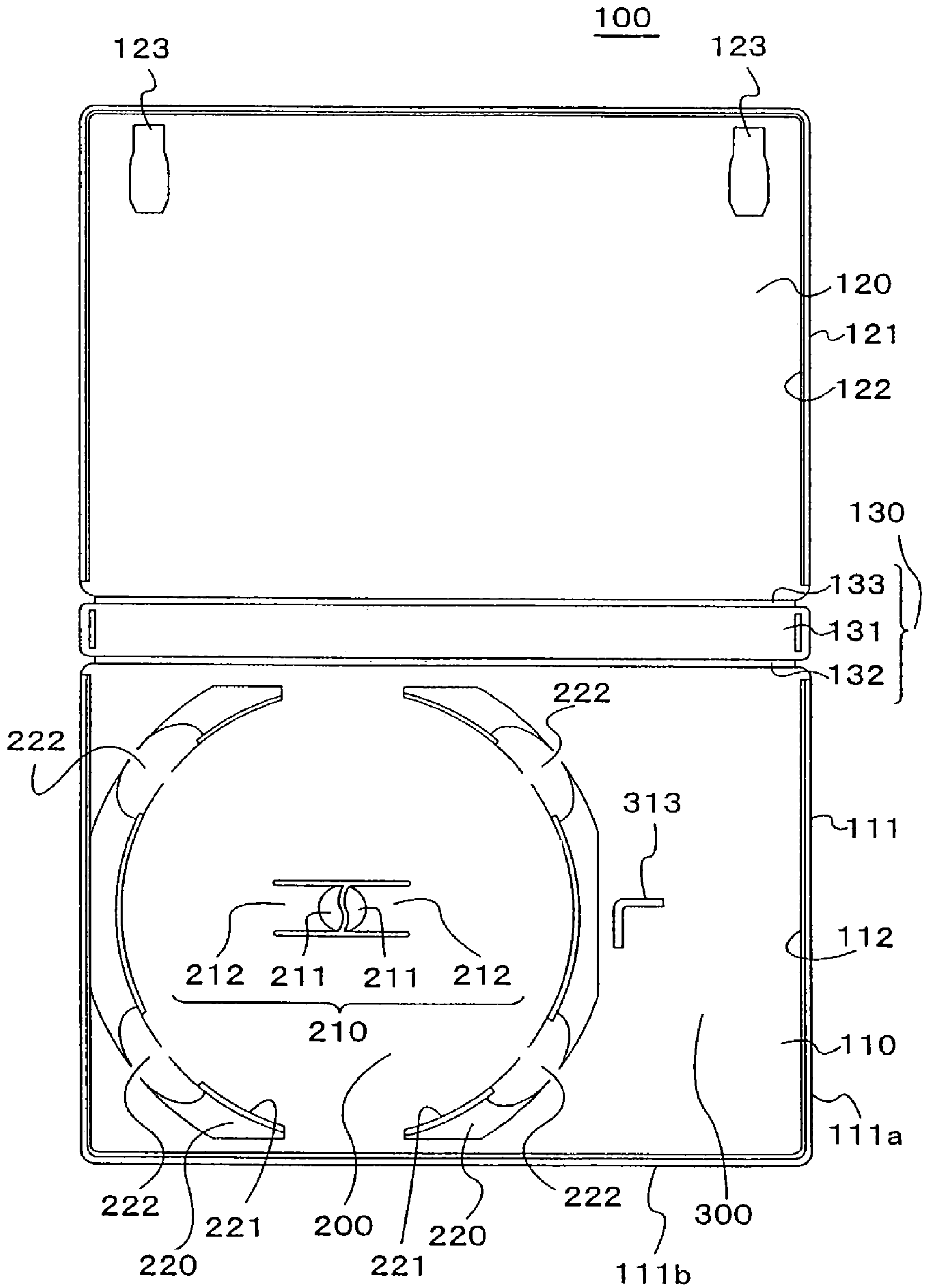
FIG. 8 is a plan view showing another example of a recording device holding portion in the recording medium holder according to the first embodiment of the present invention.

An example shown in FIG. 8 is an example which further simplifies the example shown in FIG. 7. That is, a frame portion 111 and a stepped portion 112 of a first member 110 are made use of as constituting members of a mechanism for holding the, recording device 500. As shown in FIG. 8, one protruding portion 313 having an L-shape is formed on the first member 110 and, in the same manner as the example shown in FIG. 7, corner portions 511, 513 on a diagonal line of the recording device 500 are brought into pressure contact with and held by the protruding portion 313 and the frame portions 111*a*, 111*b* to hold the recording device 500. Since this example uses one protruding portion 313, an advantage that the structure becomes simple is obtained.

Figure 9:
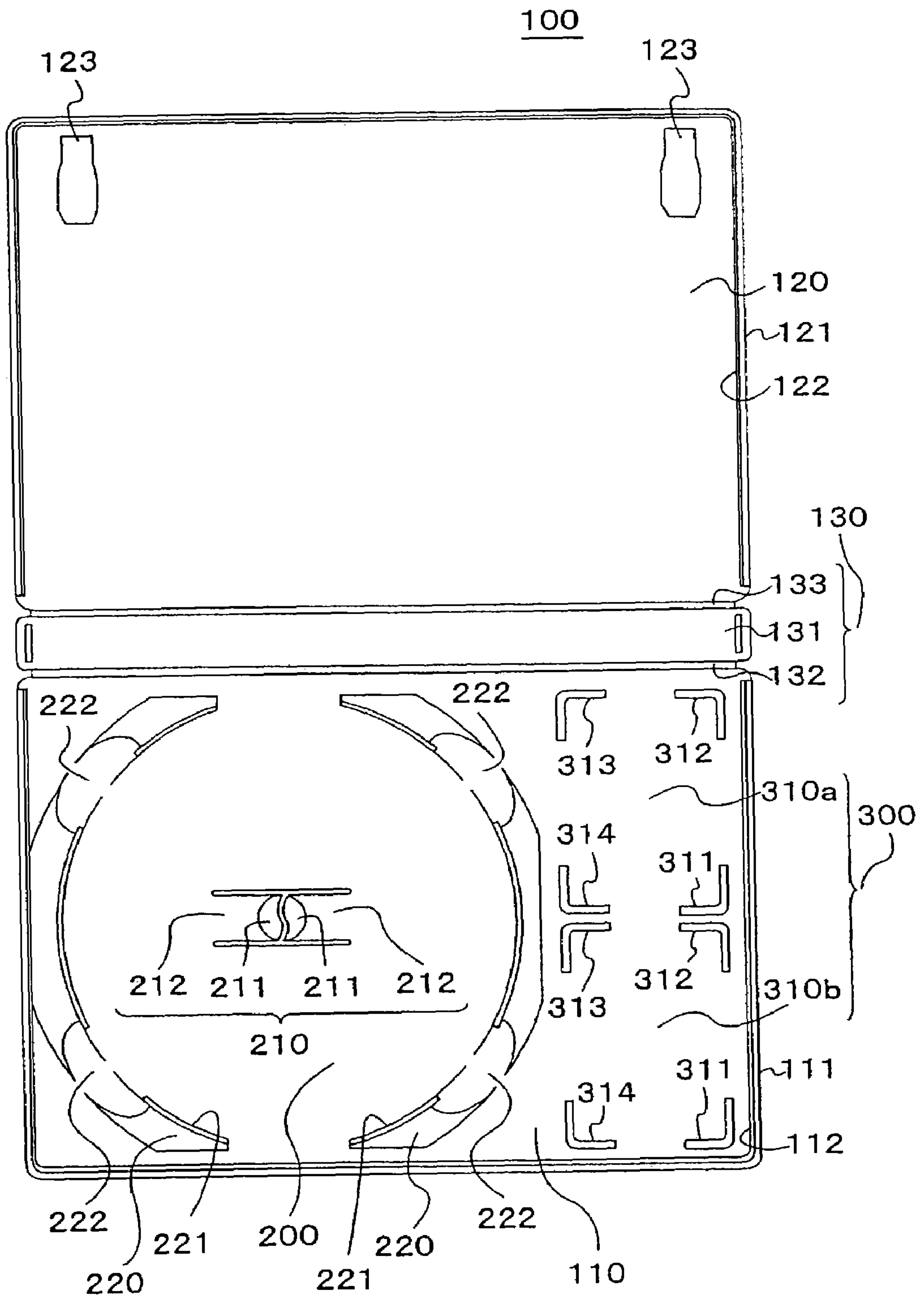
FIG. 9 is a plan view showing another example of a recording device holding portion in the recording medium holder according to the first embodiment of the present invention.

An example shown in FIG. 9 is constituted such that two recording devices 500 can be accommodated in a second accommodating region 300. That is, as shown in FIG. 9, two recording device holding portions 310*a*, 310*b* having the same structure shown in FIG. 1 which has four protruding portions 311–314, are arranged in parallel. The structure of the recording device holding portions 310*a*, 310*b* and their function of holding the recording device 500 are as same as those of the recording device holding portion 300 shown in FIG. 1. According to this example, one accommodating member can hold two recording devices 500.

Further, according to this example, there is an advantage that when game software recorded in a recording medium 400 relates to a game suitable for playing by two players, data can be recorded to the recording devices 500 corresponding to respective players, for example.

Further, according to this example, in the case that an amount of data to be recorded in the recording device 500 is expected to be large, this example can easily cope with the case since two recording devices 500 can be accommodated. Further, there may be a case that this modification is manufactured substantially as a standard and a software maker or a game software user normally mounts one recording device 500 in either one of the recording device holding portions 310*a* while setting the other recording device holding portion 310*b* in the empty state. Then, when the software maker or a game software user uses two recording devices 500, he or she mounts the recording devices 500 in two recording device holding portions 310*a*, 310*b* respectively.

In the above-mentioned respective modifications, respective protruding portions can be inclined in a direction to pinch or clamp the recording device 500 or they may be provided with engaging portions.

Further, in the present invention, the configuration of the second accommodating region is not limited to the above-mentioned examples and further various modifications are possible. For example, in place of the above-mentioned protruding portions, pin-shaped protruding portions may be provided to the second accommodating region. Further, the second accommodating region may be constituted by recessed portions in place of the protruding portions. In this case, the holding of the recording device is performed by a wall surface of the recessed portion.

In the above-mentioned first and second embodiments, the first accommodating region 200 and the second accommodating region 300 are provided to the first member 110. The present invention, however, is not limited to such a constitution. For example, out of the first accommodating region 200 and the second accommodating region 300, at least one of them may be provided to the second member 120, for example. In this manner, in the case that the second member 120 also has such an accommodating function, the accommodation of equal to or more than 2 sheets of recording mediums and/or the accommodation of equal to or more than 2 recording devices become possible respectively.

Figure 10:
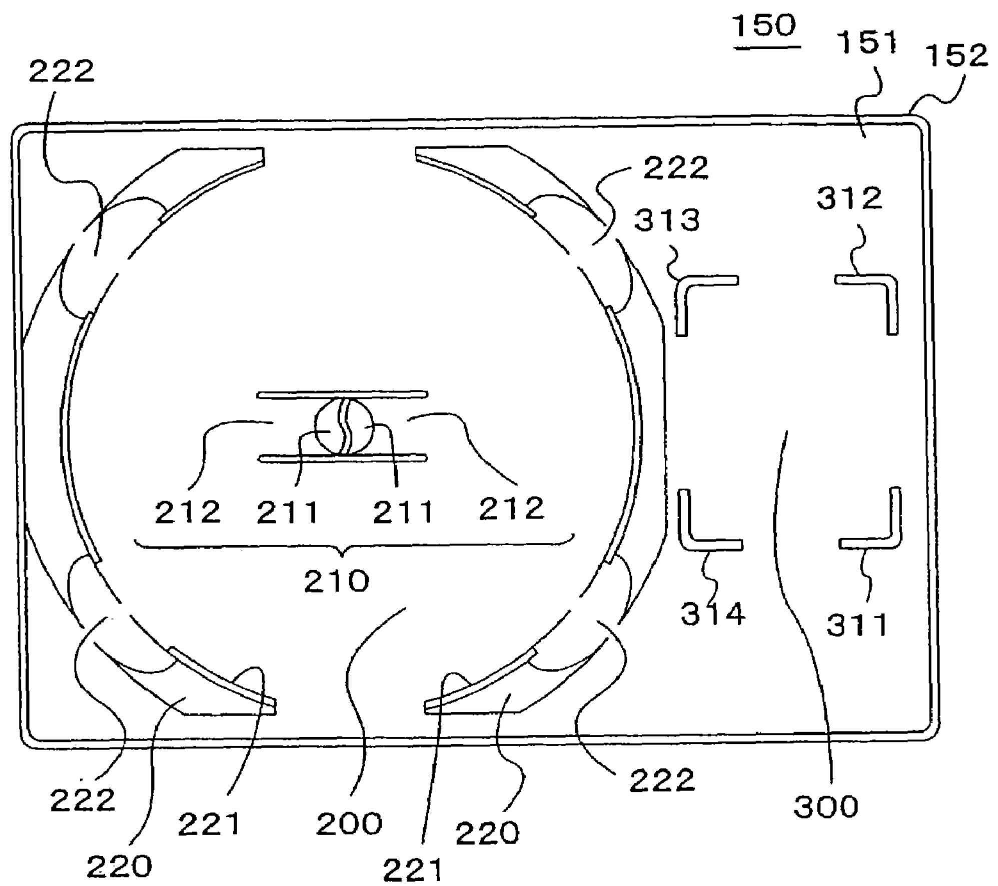
FIG. 10 is a plan view showing one example of a recording medium holder according to the third embodiment of the present invention.
Figure 11:
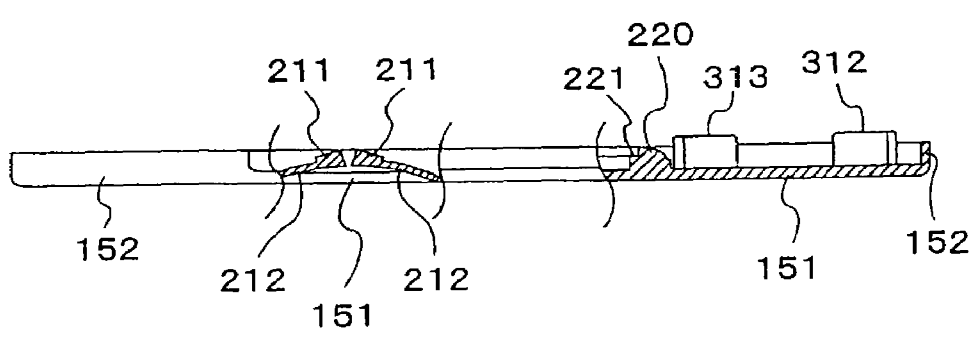
FIG. 11 is a front view showing a cross section with a part broken away of a recording medium holder according to the third embodiment of the present invention.
Figure 12:
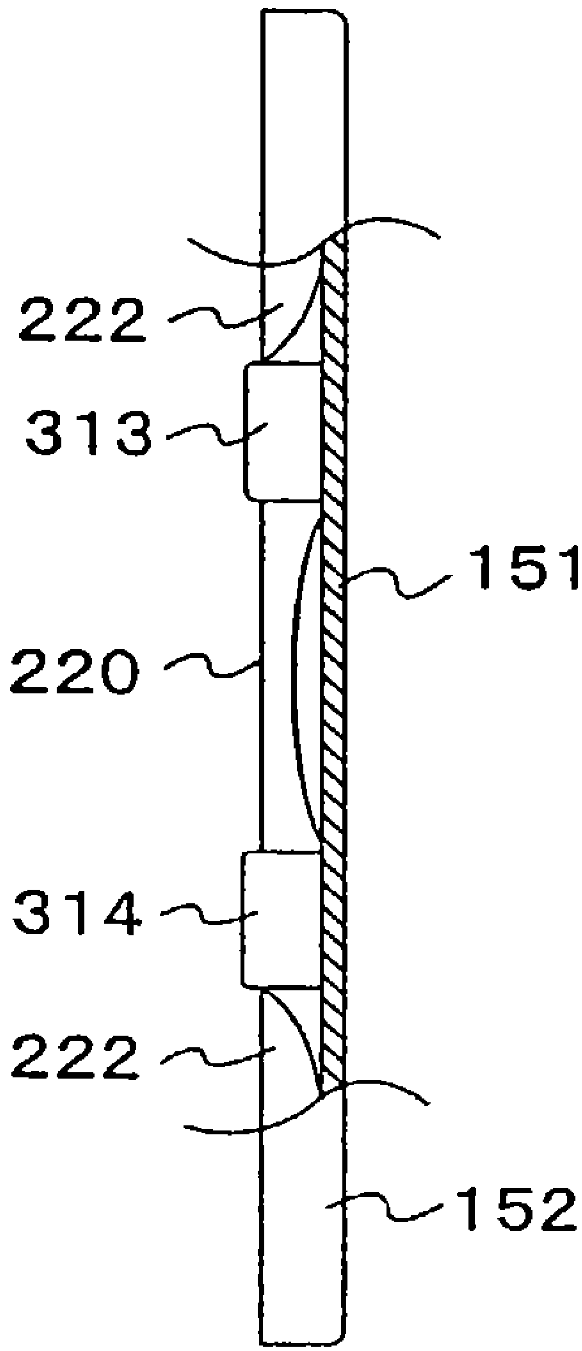
FIG. 12 is a side view showing a cross section with a part broken away of a recording medium according to the third embodiment of the present invention.

Then, the third embodiment of the present invention is explained in conjunction with FIGS. 10 to 12. Different from the first embodiment, this embodiment is characterized by an accommodating member having a tray structure. The structures of a first accommodating region 200 and a second accommodating region 300 are substantially as same as those of the first embodiment. The same goes for modifications of the structures of the first accommodating region 200 and the second accommodating region 300. Accordingly, here, the explanation is made focusing on the tray structure.

As shown in FIGS. 10 to 12, an accommodating member 150 has a tray structure which is constituted by a bottom plate member 151 and a frame portion 152 which is mounted on the periphery of the bottom plate member 151. In the same manner as the example shown in FIG. 1, a first accommodating region 200 and a second accommodating region 300 are formed on the bottom plate member 151. Their respective structures are identical to those shown in FIG. 1 and hence, the repeated explanation is omitted here. Further, the accommodating member 150 of this embodiment differs from the accommodating member shown in FIG. 1 on a point that a stepped portion is not formed on the inside of a frame portion 152.

This embodiment is not provided with a member which constitutes a lid. Accordingly, a box body such as a bookcase may be prepared separately and used for accommodating the accommodating member 150. Further, as a simplified packaging, the accommodating member 150 may be packaged with a packaging material as it is.

As described above, according to respective embodiments of the present invention, the recording medium which records software and the recording device which records data generated in relation to the software can be accommodated in one accommodating member. Accordingly, it becomes possible for the user of the software to store the recording medium which records the software and the recording device for recording data relevant to the software in a form that they are made relevant to each other, and to ensure the recording device per se without preparing it separately from the software.

On the other hand, when viewed from a standpoint of the software maker, the software maker can constitute the information providing body in a form that recording device which has been an accessory of an information processing apparatus such as the game apparatus or the like is accommodated in the same accommodating member together with the recording medium which records the software while relating them to each other and provide such an information providing body to users. Further, according to the information providing body of the present invention, a software producer can expect that the recording device is assuredly present in the information providing body and hence, the software producer can produce more complicated software which requires the saving of data as the presumption. Further, according to the information providing body of the present invention, it becomes possible for the software maker to preliminarily record a specific information to the recording device which is served to software users.

Although the recording device used in the embodiments described heretofore is provided for recording data on the game, the present invention is not limited to such recording device.

Further, in the above-mentioned embodiments, although the recording device for recording data generated along with the processing is explained, the present invention is not limited to such a recording device. As the recording device, a recording device which constitutes a small-sized computer including a memory, a CPU and a display may be used, for example. In this case; this recording device can be used as a subsystem. For example, the recording device can be used as a small-sized game apparatus system.

Accordingly, the recording medium holder of the present invention may accommodate the recording medium which records the software as well as the small-sized computer which records data generated in relation to the software and performs processing based on the data as the recording device. To be more specific, the small-sized device provided with a function of executing a game using the recorded data, for example, the recording device which functions as a mini-game device or a sub-game device can be accommodated. Further, with respect to the information providing body of the present invention, an information providing body which accommodates the recording medium which records software and a small-sized computer for performing processing related with processing of the software may be provided.

As has been described heretofore, according to the recording medium holder of the present invention, the storage of the recording device in a form that the relevance thereof with information such as the corresponding software or the like is maintained can be performed easily without compelling a user to bear any special burden.

Further, the information providing body of the present invention allows an easy preparation and storage of the recording device, without compelling a user to bear any special burden, in a form that its relevance with information such as the corresponding software or the like is maintained. Further, the recording device can be provided in relation to the recording medium which records the information.

What is claimed is:

1. A case of a folder type having therein a card-type recording device provided with a concave-convex portion in its side surface, for accommodating a disc-type recording medium, comprising:

a first member being a cover of said case, and a second member being another cover of said case;

wherein in a surface of said first member to be the inner side of the case, a first accommodating region accommodating said disc-type recording medium, which has a frame portion defining a substantially circular periphery, and a second accommodating region having said card-type recording device disposed therein, which has one or more protruding portions defining a substantially polygonal periphery, are disposed so as not to substantially overlap to each other, and the protruding portions which the second accommodating region has, are disposed so as to avoid the concave-convex portion of the accommodated card-type recording device.

2. A case of a folder type for accommodating a disc-type recording medium according to claim 1, wherein in the frame portion of the first accommodating region, a stepped portion is provided so that the recording area of the disc-type recording medium does not come into contact with the surface of the first member to be the inner side of the case.

3. A case of a folder type for accommodating a disc-type recording medium according to claim 1, wherein in a surface of the second member to be the inner side of the case, a manual holding portion for holding a manual is provided.

4. A case of a folder type for accommodating a disc-type recording medium according to claim 1, wherein the surface of the first member to be the inner side of the case has a substantially rectangular shape, and the first accommodating region and the second accommodating region are disposed side by side in the longitudinal direction of the surface of the first member to be the inner side of the case.

5. A case of a folder type for accommodating a disc-type recording medium according to claim 1, wherein the first accommodating region and the second accommodating region are disposed such that central lines thereof in the longitudinal direction of the surface of the first member to be the inner side of the case agree to each other.

* * * * *